(12) United States Patent
Wobben

(10) Patent No.: US 8,100,663 B2
(45) Date of Patent: Jan. 24, 2012

(54) ROTOR BLADE FOR A WIND POWER PLANT

(76) Inventor: Aloys Wobben, Aurich (DE)

( * ) Notice: Subject to any disclaimer, the term of this patent is extended or adjusted under 35 U.S.C. 154(b) by 0 days.

(21) Appl. No.: 12/728,109

(22) Filed: Mar. 19, 2010

(65) Prior Publication Data

US 2010/0232972 A1    Sep. 16, 2010

Related U.S. Application Data

(60) Continuation of application No. 11/846,391, filed on Aug. 28, 2007, now Pat. No. 7,708,530, and a continuation of application No. 11/846,396, filed on Aug. 28, 2007, now Pat. No. 7,914,261, said application No. 11/846,391 is a division of application No. 10/516,804, filed on Aug. 4, 2005, now Pat. No. 7,357,624, said application No. 11/846,396 is a division of application No. 10/516,804, filed as application No. PCT/EP03/05605 on May 28, 2003.

(30) Foreign Application Priority Data

Jun. 5, 2002 (DE) .................. 102 25 136
Feb. 21, 2003 (DE) .................. 103 07 682

(51) Int. Cl.
*F03D 1/06* (2006.01)

(52) U.S. Cl. .................... 416/234; 415/4.3

(58) Field of Classification Search .......... 415/4.3, 415/4.5, 908; 416/234, 242, 243; 290/44, 290/55

See application file for complete search history.

(56) References Cited

U.S. PATENT DOCUMENTS

| | | | |
|---|---|---|---|
| 1,403,069 A | 1/1922 | Burne |
| 2,400,388 A | 5/1946 | Campbell |
| 2,428,936 A | 10/1947 | Hunter |
| 2,442,783 A | 6/1948 | Senn |
| 2,453,403 A | 11/1948 | Bogardus |
| 2,465,007 A | 3/1949 | Bragdon et al. |
| 2,485,543 A | 10/1949 | Andreau |
| 2,616,509 A | 11/1952 | Thomas |
| 2,622,686 A | 12/1952 | Chevreau et al. |

(Continued)

FOREIGN PATENT DOCUMENTS

DE    31 26 677    1/1983

(Continued)

OTHER PUBLICATIONS

Aloys Wobben, "Rotor Blade for a Wind Power Plant," Office Action dated Aug. 18, 2010, for U.S. Appl. No. 11/846,396, 9 pages.

(Continued)

*Primary Examiner* — Nathaniel Wiehe
(74) *Attorney, Agent, or Firm* — Seed IP Law Group PLLC

(57) ABSTRACT

The invention concerns a rotor blade of a wind power installation and a wind power installation. One advantage of the present invention is to provide a rotor blade having a rotor blade profile, and a wind power installation, which has better efficiency than hitherto. A rotor blade of a wind power installation, wherein the rotor blade has a thickness reserve approximately in the range of between 15% and 40%, preferably in the range of between about 23% and 28%, and wherein the greatest profile thickness is between about 20% and 45%, preferably between about 32% and 36%.

10 Claims, 17 Drawing Sheets

U.S. PATENT DOCUMENTS

| | | | |
|---|---|---|---|
| 2,934,150 A | 4/1960 | Fink | |
| 3,184,187 A | 5/1965 | Isaac | |
| 3,463,420 A | 8/1969 | Butler et al. | |
| 3,874,816 A * | 4/1975 | Sweeney et al. | 416/139 |
| 3,987,984 A | 10/1976 | Fischer | 244/44 |
| 4,247,253 A | 1/1981 | Seki et al. | 416/44 |
| 4,274,011 A | 6/1981 | Garfinkle | 290/55 |
| 4,408,958 A | 10/1983 | Schacle | 416/237 |
| 4,419,053 A | 12/1983 | Swearingen, Jr. | 416/234 |
| 4,498,017 A | 2/1985 | Parkins | 290/44 |
| 4,519,746 A | 5/1985 | Wainauski et al. | 416/223 R |
| 4,613,760 A | 9/1986 | Law | 290/1 C |
| 4,692,095 A | 9/1987 | Lawson-Tancred | 416/23 |
| 4,699,568 A | 10/1987 | Harlamert et al. | 416/95 |
| 4,732,542 A | 3/1988 | Hahn et al. | 416/226 |
| 4,773,824 A | 9/1988 | Kiss | 416/168 A |
| 4,773,825 A | 9/1988 | Rodde et al. | 416/223 R |
| 4,830,574 A | 5/1989 | Wainauski et al. | 416/223 R |
| 4,976,587 A | 12/1990 | Johnston et al. | 416/230 |
| 5,096,378 A | 3/1992 | Jamieson | 416/23 |
| 5,106,265 A | 4/1992 | Holzem | 416/23 |
| 5,320,491 A | 6/1994 | Coleman et al. | 416/24 |
| 5,417,548 A | 5/1995 | Tangler et al. | 416/223 R |
| 5,474,425 A | 12/1995 | Lawlor | 416/223 R |
| 5,527,151 A | 6/1996 | Coleman et al. | 416/23 |
| 5,562,420 A | 10/1996 | Tangler et al. | 416/223 R |
| 5,570,859 A | 11/1996 | Quandt | 244/213 |
| 5,570,997 A | 11/1996 | Pratt | 416/117 |
| 6,015,115 A | 1/2000 | Dorsett et al. | 244/123 |
| 6,068,446 A | 5/2000 | Tangler et al. | 416/223 R |
| 6,133,716 A | 10/2000 | Schutten | 322/40 |
| 6,420,795 B1 | 7/2002 | Mikhail et al. | 290/44 |
| 6,465,902 B1 | 10/2002 | Beauchamp et al. | 290/55 |
| 6,503,058 B1 | 1/2003 | Selig et al. | 416/223 R |
| 6,523,781 B2 | 2/2003 | Ragner | 244/153 R |
| 6,682,302 B2 | 1/2004 | Noble | 416/1 |
| 6,951,443 B1 * | 10/2005 | Blakemore | 415/4.3 |
| 7,204,674 B2 | 4/2007 | Wobben | 416/1 |
| 7,357,624 B2 | 4/2008 | Wobben | 416/132 B |
| D584,686 S | 1/2009 | Gudewer | D13/115 |
| 7,708,530 B2 | 5/2010 | Wobben | 416/243 |
| 2003/0099546 A1 | 5/2003 | Stiesdal et al. | 416/228 |
| 2007/0036657 A1 | 2/2007 | Wobben | 416/223 R |
| 2007/0297896 A1 | 12/2007 | Wobben | 415/130 |

FOREIGN PATENT DOCUMENTS

| | | |
|---|---|---|
| DE | 39 13 505 | 11/1989 |
| DE | 40 02 972 | 8/1991 |
| DE | 44 28 731 | 2/1996 |
| DE | 44 35 606 | 4/1996 |
| DE | 197 19 221 | 10/1998 |
| DE | 694 15 292 | 7/1999 |
| EP | 0 283 730 | 9/1988 |
| EP | 0 375 382 | 6/1990 |
| EP | 1 184 566 | 3/2002 |
| FR | 908631 | 4/1946 |
| FR | 2 290 585 | 6/1976 |
| FR | 2 587 675 | 3/1987 |
| GB | 2 311 978 | 10/1997 |
| JP | 55-153870 | 12/1980 |
| JP | 61-140181 | 8/1986 |
| JP | 5-180146 | 7/1993 |
| SU | 577300 | 11/1977 |
| SU | 1539-378 | 1/1990 |
| WO | 01/55590 | 8/2001 |
| WO | 01/83983 | 11/2001 |
| WO | 02/051730 | 7/2002 |
| WO | 2004/097215 | 11/2004 |

OTHER PUBLICATIONS

Bjorck, "Coordinates and Calculations for the FFA-W1-xxx, FFA-W2-xxx and FFA-W3-xxx Series of Airfoils for Horizontal Axis Wind Turbines" The Aeronautical Research Institute of Sweden, 1990, 150 pages, Stockholm, Sweden.

Hau, Erich, *Windkraftanlagen*, Springer-Verlag, 1988.

Timmer et al., "Thick airfoils for HAWTs" Journal of Wind Engineering and Industrial Aerodynamics 39: 151-160, 1992.

"Statement of Grounds and Particulars" in re: Vestas Wind Systems A/S of Randers, Denmark, Comments in support of Notice of Opposition to Australian Patent Application No. 2003237707, Jul. 10, 2008, pp. 1-6, Hawthorn, Australia.

Jackson, K. J. et al., "Innovative Design Approaches for Large Wind Turbine Blades," *Wind Energ.* 2005; 8: 141-171, Nov. 29, 2004, 31 pages.

\* cited by examiner

ROTOR BLADE FOR A WIND POWER PLANT

CROSS-REFERENCE TO RELATED APPLICATIONS

This application is a continuation application of U.S. patent application Ser. No. 11/846,391, filed Aug. 28, 2007, and U.S. patent application Ser. No. 11/846,396, filed Aug. 28, 2007, each of which is a divisional application of U.S. patent application Ser. No. 10/516,804, filed Aug. 4, 2005, issued on Apr. 15, 2008 as U.S. Pat. No. 7,357,624, which is a national stage application filed under 35 U.S.C. §371 of International Application No. PCT/EP03/05605, accorded an International Filing Date of May 28, 2003, which claims priority to German Application No. 102 25 136.3, filed Jun. 5, 2002 and German Application No. 103 07 682.4, filed Feb. 21, 2003. These applications are hereby incorporated herein by reference in their entireties.

BACKGROUND OF THE INVENTION

1. Field of the Invention

The invention concerns a rotor blade of a wind power installation, and a wind power installation. As state of the art in this respect attention should be directed generally to the book 'Windkraftanlagen', Erich Hau, 1996. That book contains some examples of wind power installations, rotor blades of such wind power installations as well as cross-sections of such rotor blades from the state of the art. Page 102, FIG. 5.34, illustrates the geometrical profile parameters of aerodynamic profiles in accordance with NACA. It is to be seen in that respect that the rotor blade is described by a profile depth which corresponds to the length of the chord, a greatest camber (or camber ratio) as the maximum rise of a median line over the chord, a camber reserve, that is to say the location with respect to the profile depth where the greatest camber is provided within the cross-section of the rotor blade, a greatest profile thickness as the largest diameter of an inscribed circle with the center point on the median line and the thickness reserve, that is to say the location with respect to the profile depth where the cross-section of the rotor blade assumes its greatest profile thickness. In addition the leading-edge radius and the profile co-ordinates of the underside and the top side are brought into consideration to describe the cross-section of the rotor blade. The nomenclature known from the Erich Hau book is to be retained inter alia for the further description of the cross-section of a rotor for the present application.

2. Description of the Related Art

Rotor blades are to be optimized in regard to a large number of aspects. On the one hand they should be quiet while on the other hand they should also afford a maximum dynamic power so that, even with a quite slight wind, the wind power installation begins to run and the nominal wind speed, that is to say the speed at which the nominal power of the wind power installation is also reached for the first time, is already reached at wind strengths which are as low as possible.

If then the wind speed rises further, nowadays when considering pitch-regulated wind power installations the rotor blade is increasingly set into the wind so that the nominal power is still maintained, but the operative surface area of the rotor blade in relation to the wind decreases in order thereby to protect the entire wind power installation or parts thereof from mechanical damage. It is crucial however that great significance is attributed to the aerodynamic properties of the rotor blade profiles of the rotor blade of a wind power installation.

BRIEF SUMMARY OF THE INVENTION

One advantage of the present invention is to provide a rotor blade having a rotor blade profile and a wind power installation, which involve better efficiency than hitherto. The advantage may be attained by a rotor blade having a rotor blade profile with the features as set forth in at least some of the disclosed embodiments. Other advantageous developments are described herein.

The specific co-ordinates of a rotor blade profile according to the invention are set forth in a Table 1.

BRIEF DESCRIPTION OF THE SEVERAL VIEWS OF THE DRAWINGS

The invention is illustrated hereinafter by a number of drawings in which.

DETAILED DESCRIPTION OF THE INVENTION

Figure 18:
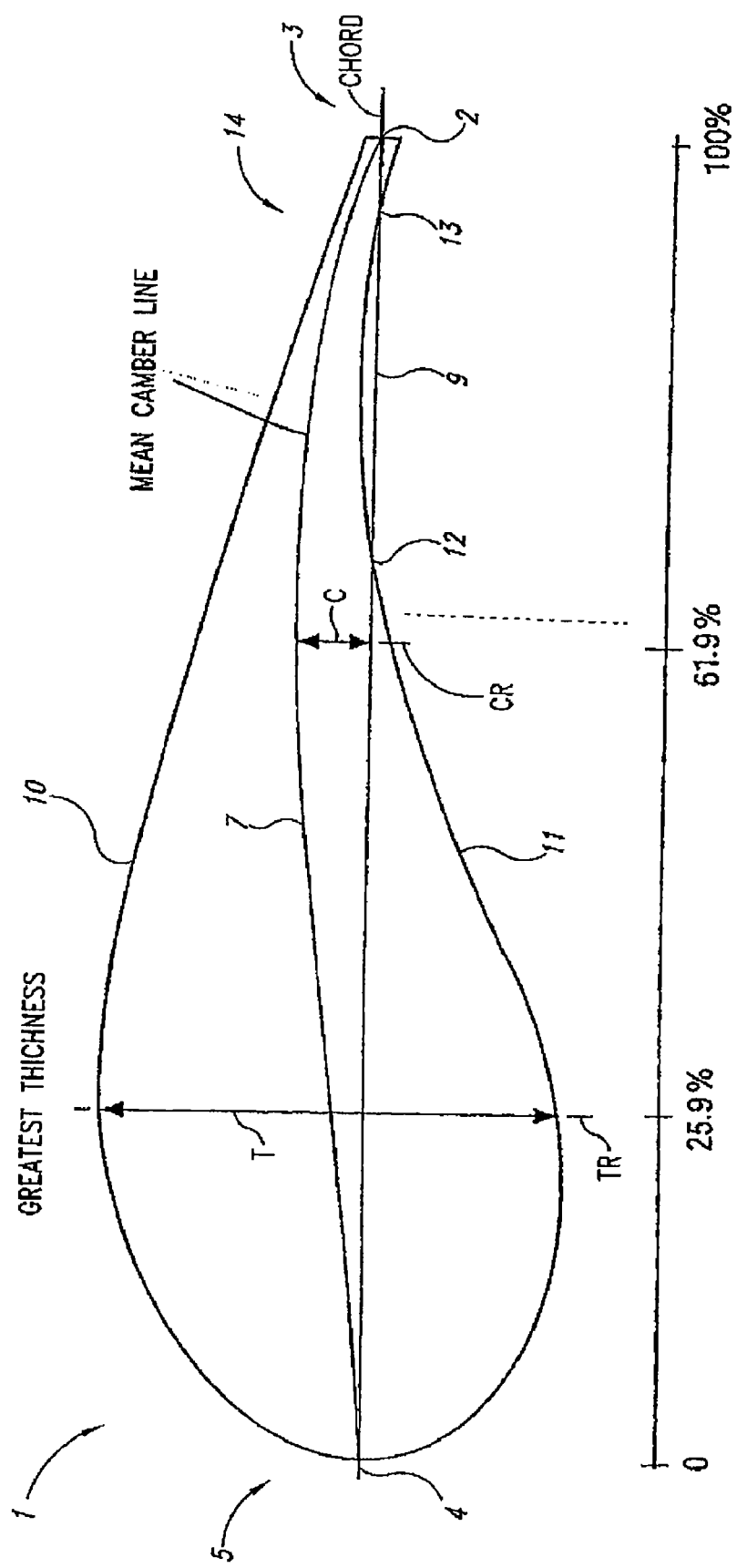
FIG. 18 shows a cross-section of a rotor blade according to the invention (in the region near the hub).

FIG. 18 shows the rotor blade profile described in accordance with one illustrated embodiment. In particular, in the region of the rotor blade which adjoins the rotor blade connection, (for connection to the hub) the profile is of a selected size and shape. The profile described in the present embodiment is provided in the first third of the rotor blade 1, with respect to the overall length of the rotor blade 1. In this respect the overall length L of a rotor blade 1 may definitely be in the range of between 10 m and 70 m, depending on the nominal power which a wind power installation is to involve. Thus, for example, the nominal power of a wind power installation from the corporation Enercon of type E-112 (diameter about 112 m) is 4.5 MW while the nominal power of a wind power installation from Enercon of type E-30 is 300 KW.

What is particularly characteristic in terms of the profile of the rotor blade 1 according to the invention is that the greatest profile thickness is between about 25% and 40%, preferably between 32% and 36%, of the length of a rotor blade chord 9. In FIG. 18, the greatest profile thickness is about 34.6% of the length of the rotor blade chord 9. The chord 9 extends from the center 2 of the rotor blade trailing edge 3 to the foremost point 4 of the rotor blade leading edge 5. The thickness reserve TR, that is to say the location in relation to the blade length where the greatest profile thickness occurs, is between about 20% and 30% of the length of the chord, preferably between 23% and 28%, and about 25.9% in the illustrated example. The greatest thickness is ascertained perpendicularly to the chord 9 and the reserve TR is related to the rotor blade leading edge.

In addition, FIG. 18 shows mean camber line 7. The camber line 7 results from half the respective thickness of the rotor blade 1 at a point. Accordingly, the camber line 7 does not extend in a straight line, but instead extends between oppositely disposed points on an increased-pressure side 10 of the rotor blade 1 and a reduced-pressure side 11 of the rotor blade 1. The camber line 7 intersects the chord 9 at the trailing edge 3 of the rotor blade 1 and the leading edge 5 of the rotor blade 1.

The camber reserve CR in the cross-section of a rotor blade 1 is located between about 55% and 70% of the length of the chord 9, and preferably between about 59% and 63%. In the illustrated example the camber reserve CR is located at about 61.9% of the length of the chord 9. The amount of camber C at the camber reserve CR can be between about 4% and 8% of the length of the chord, and preferably between about 5% and 7% of the length of the chord. In the illustrated example, the camber "C" is about 5.87% of the length of the chord.

It is further particularly striking in terms of the profile of the rotor blade 1 that the reduced-pressure side 11 of the rotor blade 1 'cuts' the chord twice at points 12 and 13. That is to say in that the reduced-pressure side 11 of the profile is of a concave configuration, while in the front region of the profile, the increased-pressure side 10 is of a convex configuration. In the region where the increased-pressure side 10 is of a convex configuration, in the corresponding, oppositely disposed region on the reduced-pressure side 11, this region 14 is delimited by an almost straight line.

While it might be previously known for the reduced-pressure side 11 to be provided with a concave curvature or for the increased-pressure side 11 to be provided with a straight-line boundary as individual components, the combination of having one opposite the other is a new feature according to invention. In particular, the combination of those two measures is significant in the profile of the rotor blade 1 according to the invention and is characteristic in respect of the rotor blade profile according to the invention.

The rotor blade trailing edge 3 of the illustrated profile is also noticeably thick. This thickness, however, does not cause any problem in regard to the creation of sound at the trailing edge 3 of the rotor blade 1 because the illustrated profile is in the inner third of the rotor circle and there the orbital speed is not very high.

One embodiment of the x-y-coordinates of the profile is shown in FIG. 18 and is reproduced in Table 1. The profile of the rotor blade 1 can be made substantially as described herein. Of course, variations from Table 1 are possible and the invention can still be obtained; use of the exact x-y values in Table 1 is not required.

Figure 1:
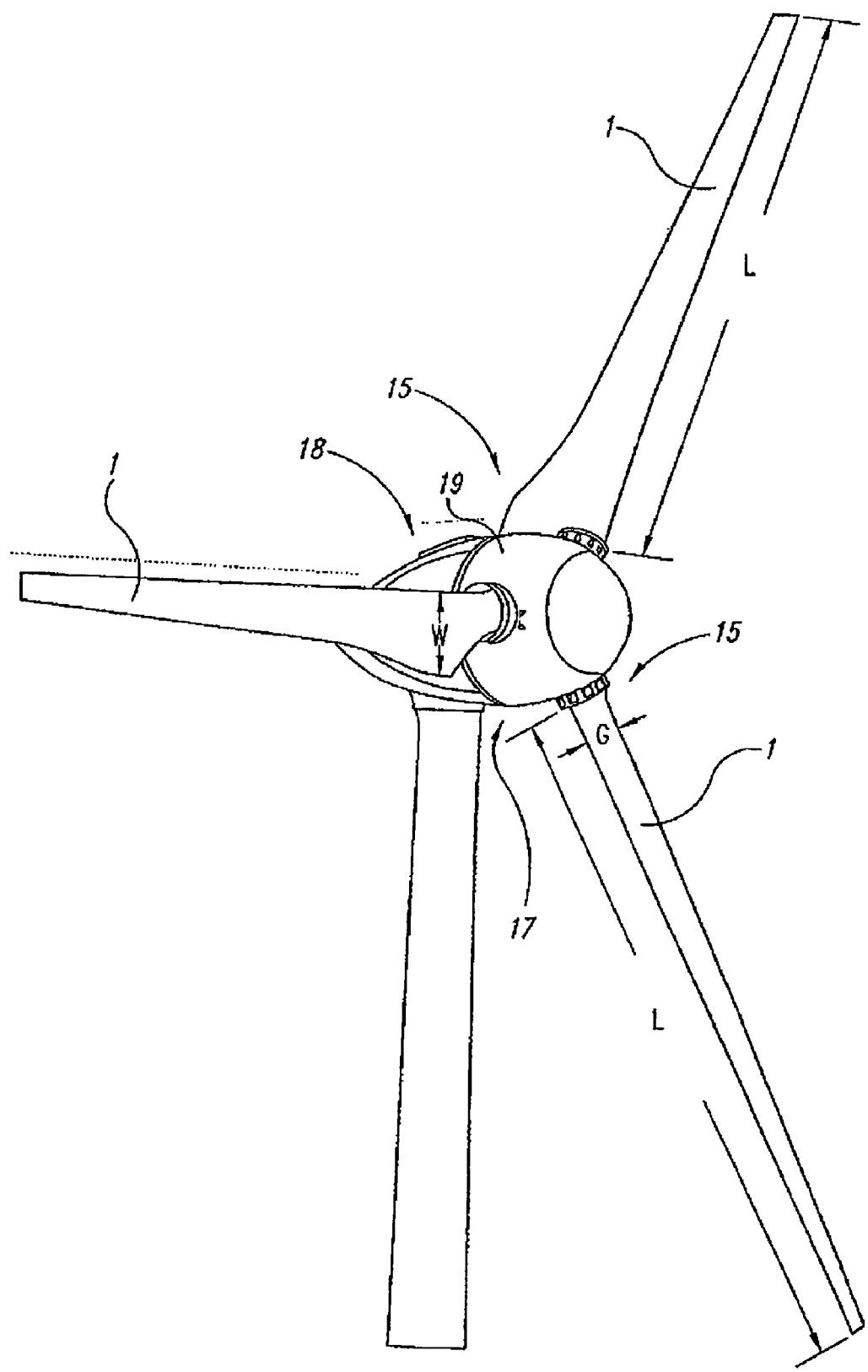
FIG. 1 shows a perspective view from the front of a wind power installation according to the invention.
Figure 2:
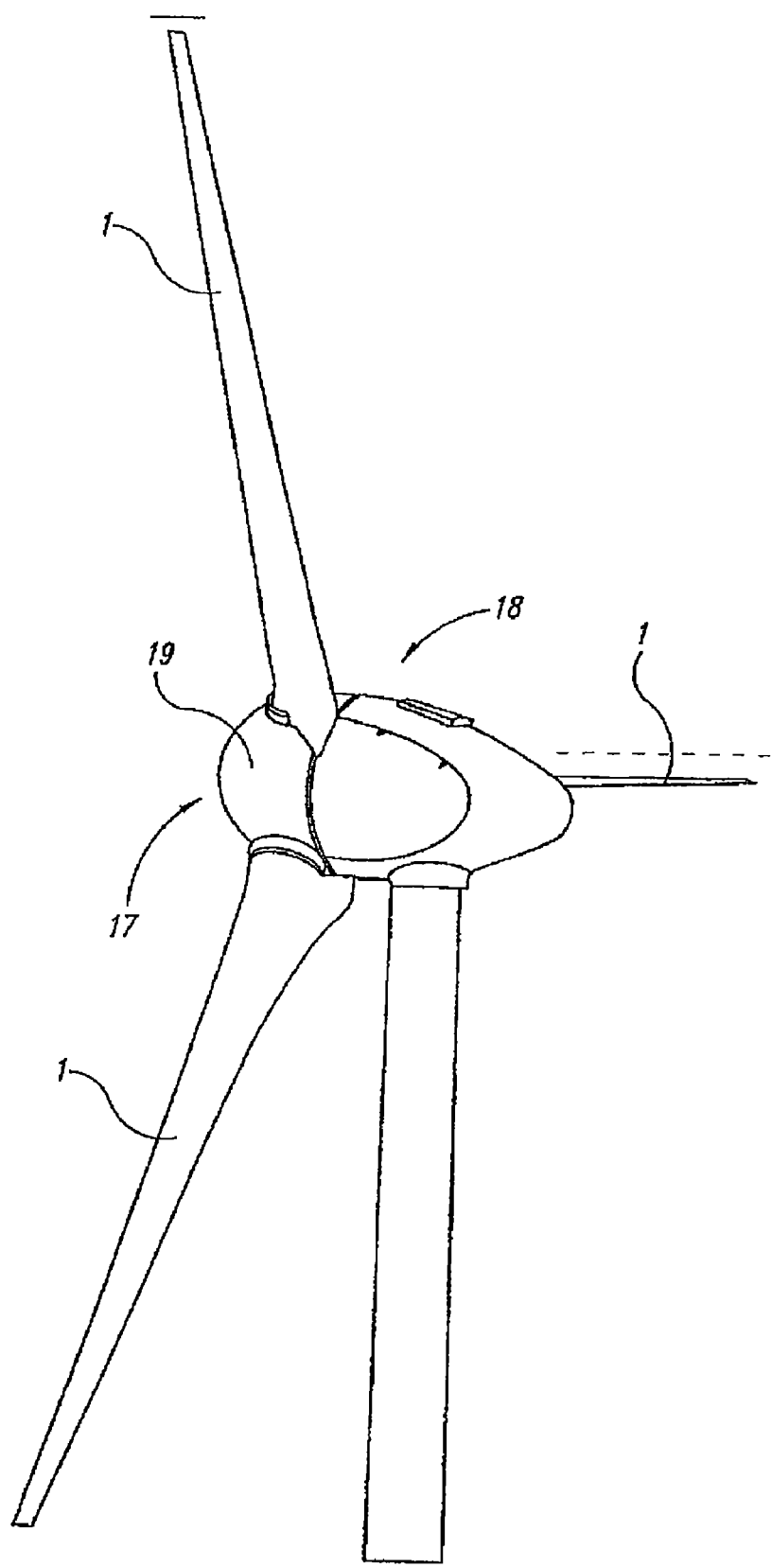
FIG. 2 shows a perspective view of a wind power installation according to the invention from the rear and the side.

As shown in FIG. 1, to improve the aerodynamic shape of the rotor blade, it is of such a configuration, in the general region of the rotor blade root 15, that there it is of its greatest width W and thus the rotor blade 1 is of a trapezoidal shape (in plan) which is more or less approximated to the optimum aerodynamic shape. Preferably in the region of the rotor blade root 15, the rotor blade 1 is of such a configuration that the edge 16 of the rotor blade root 15, which is towards a pod 18 of a wind power installation (FIG. 15), is adapted to the external contour of the pod cladding 19 of the pod 18 in at least one angular position, for example it is adapted in such a way that a very small spacing S, for example a spacing S of between about 5 mm and 100 mm, exists between the pod cladding 19 and the edge 16 of the rotor blade root 15 which is towards the wind power installation and the external contour of the pod cladding 19 when the rotor blade 1 is positioned in the nominal wind position.

A rotor blade 1 with the above-indicated properties affords a significantly higher increase in power of about up to 10%. By virtue of that increase in power, a wind power installation operating at a wind speed below the nominal wind speed, can achieve a higher power output. In addition, the wind power installation reaches its nominal power output earlier than hitherto. Accordingly, the rotor blades 1 can also be rotated to a pitched position, which can reduce sound emission and the mechanical loading on the installation.

In that respect the invention is based on the realization that the rotor blade shape which is common nowadays is investigated in a wind tunnel admittedly using different wind speeds but with an air flow which is always uniform. In nature, it is rare that the wind blows uniformly, but rather the wind is subject to a stochastic law. Standard rotor blade profiles, as a consequence of gusts, involve detachment of the flow precisely in the inner region of the blade near the rotor hub 17 where the blade no longer has an aerodynamically clean and optimum configuration. This flow detachment phenomena is propagated a distance along the rotor blade 1 in the direction towards the rotor blade tip. As a result, the flow can become detached from the rotor blade 1 in a bubble-shaped region and thus result in corresponding power losses. In the case of the present invention and in regard to the above-described situation, it is possible to achieve a considerable increase in power output by virtue of a rotor blade 1 which is of a clean configuration in the inner region of the rotor blade according to the embodiments of the present invention.

If now a known standard profile were to be used instead of the empirically ascertained blade profile, which is described herein, then, to afford an aerodynamically clean configuration for the rotor blade, approximately double the profile depth relative to the length of the chord of the rotor blade could be required in the region of the rotor blade near the hub 17. The profile thickness in the front region permits the transmission of air loads and permits the rotor blade to attain a lift value $C_A$ greater than 2.

As is known from the state of the art, rotor blades are usually constructed to entail a saving of material to the greatest possible extent in the inner region. Typical examples in that respect are disclosed in the state of the art, which has already been referred to above, in 'Windkraftanlagen', Erich Hau, 1996, on pages 114 and 115. It can be seen therein that the greatest profile depth is always attained at a certain distance from the rotor blade connection, that is to say in the region near the rotor blade connection, in which respect material is saved in those rotor blades in accordance with the state of the art. If, however, a shape approximating a trapezoidal shape is used, then the greatest width of a rotor blade is not at a spacing relative to the rotor blade connection but precisely in the region of the rotor blade connection itself. That structure then therefore does not save the greatest possible amount of material in the inner region of the rotor blades.

The approach to saving in material, as described above, has been developed by considering the static manner of the flow conditions in regard to calculating/developing the rotor blades 1. In addition, current calculation programs for rotor blades divide the rotor blade 1 into individual portions and calculate each rotor blade portion in itself in order to derive an evaluation for the overall rotor blade.

As noted above, wind does not blow uniformly and statically over a given surface area region, but markedly exhibits a stochastic behavior. The low peripheral speed of the rotor blade 1 in the inner region near the rotor hub 19 influences the wind speed and may cause the angle of incidence to change in that region in response to and dependant on the instantaneous wind speed. As a consequence, detachment of the flow from the rotor blade 1 can frequently occur in the inner region of the rotor blade 1.

A hysteresis effect is operative in such a situation. When the previous wind speed occurs again, that is to say after a gust is past, the wind is not the same at the rotor blade 1 again. Rather, the wind speed firstly has to fall further (the angle of incidence must therefore be further changed) until the air again bears against the surface of the rotor blade 1. If, however, the wind speed does not decrease, it may certainly happen that, for a prolonged period of time, in spite of the afflux flow of the wind to the rotor blade 1, a relevant force is exerted on the rotor blade 1 because the flow has not yet come to bear against (i.e., flow cleanly over) the rotor blade surface again.

The risk of flow detachment can be reduced by the embodiments of the rotor blade described herein. For example, the detachment risk is reduced by the relatively thick profile. The thick profile of rotor blade 1 provides an increase in power can also be well explained by virtue of due to the hysteresis effect, once flow detachment has occurred, the power losses are maintained over a considerable period of time for rotor blades in accordance with the state of the art.

A further part of the increase in power can be explained by virtue of the fact that the wind follows the path of least resistance. Thus, if the rotor blade is very thin in the inner region near the hub 17 because of saving material, then this can be viewed as a 'slip hole' in the harvesting area of the rotor circle (i.e., around and proximate to the pod 18), through which air preferentially flows. In this case, it is possible to see that the common calculation programs based on uniform distribution over the rotor circle area may not be sufficiently accurate.

Figure 3:
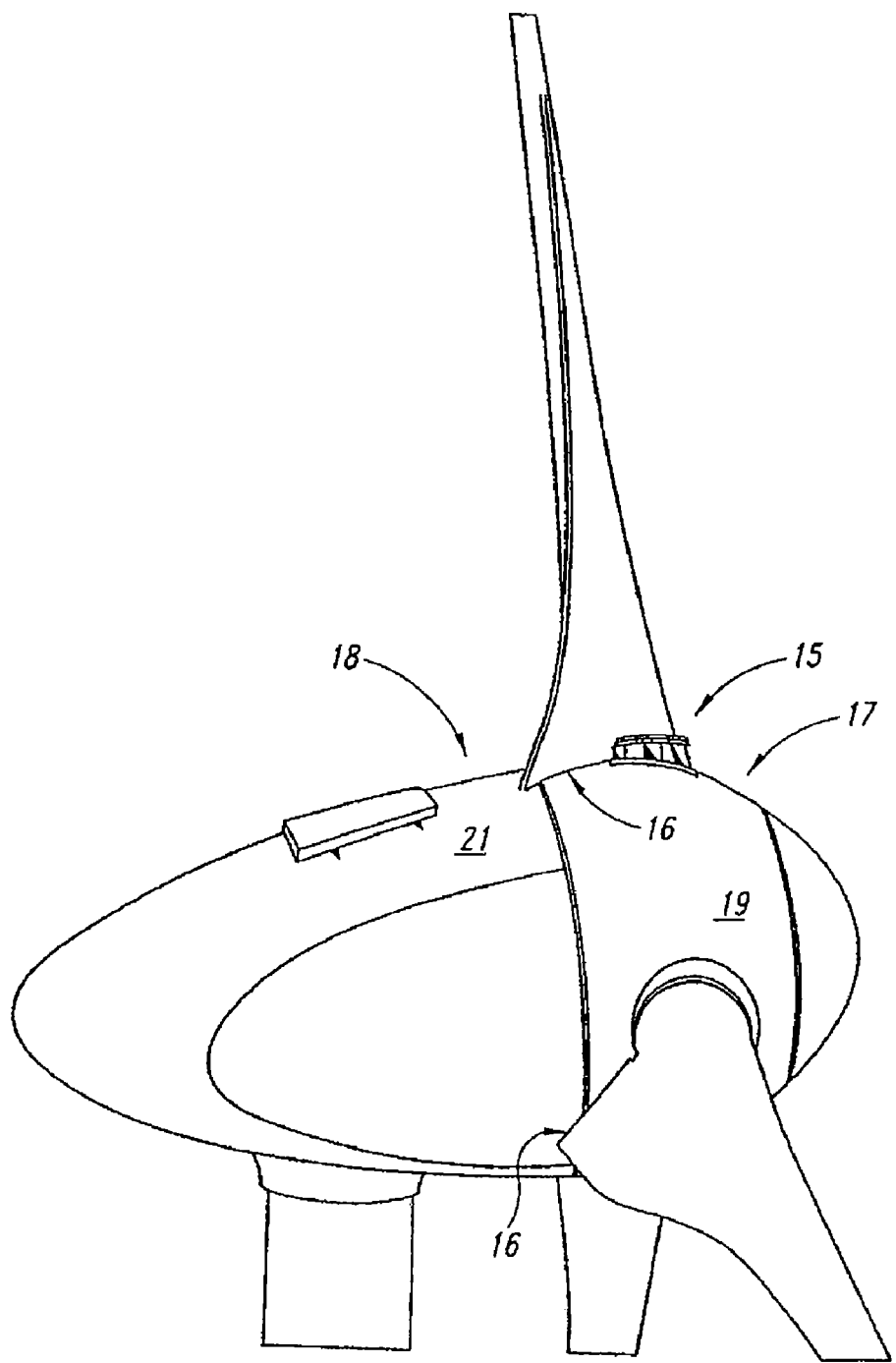
FIG. 3 shows a view of a wind power installation according to the invention from the side.
Figure 4:
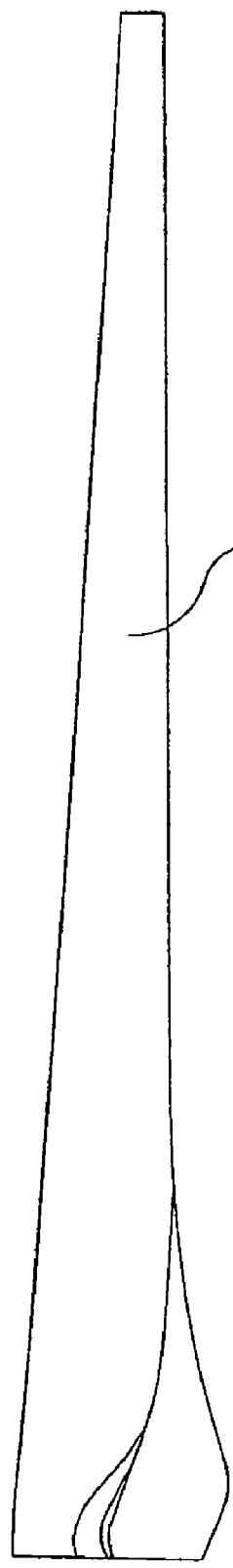
FIGS. 4-8 show views of a rotor blade according to the invention from various directions.
Figure 5:
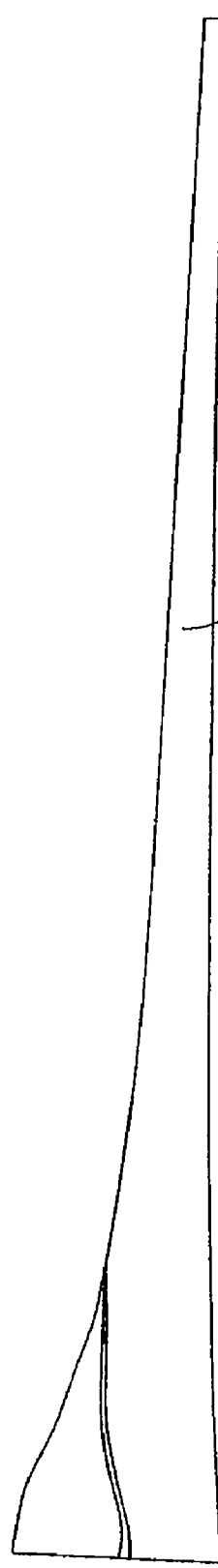
Figure 6:
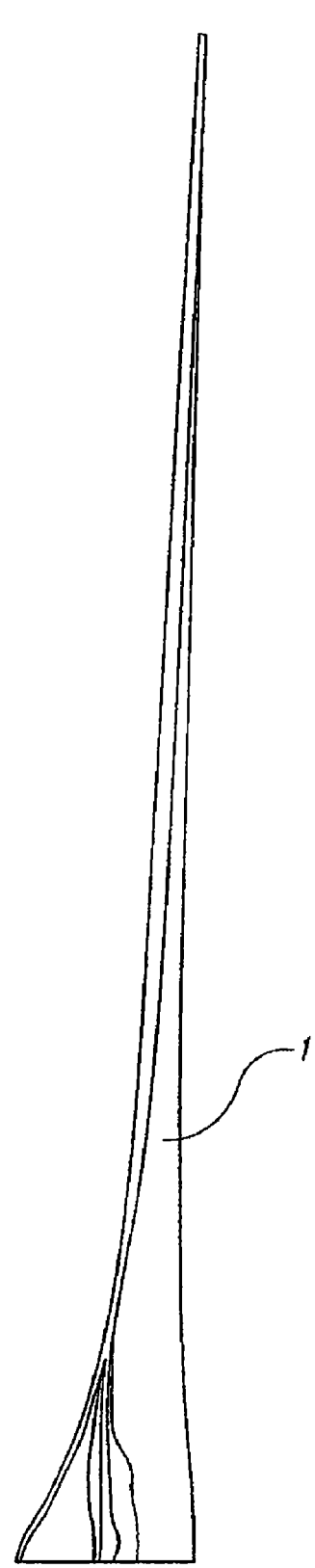
Figure 7:
Figure 8:
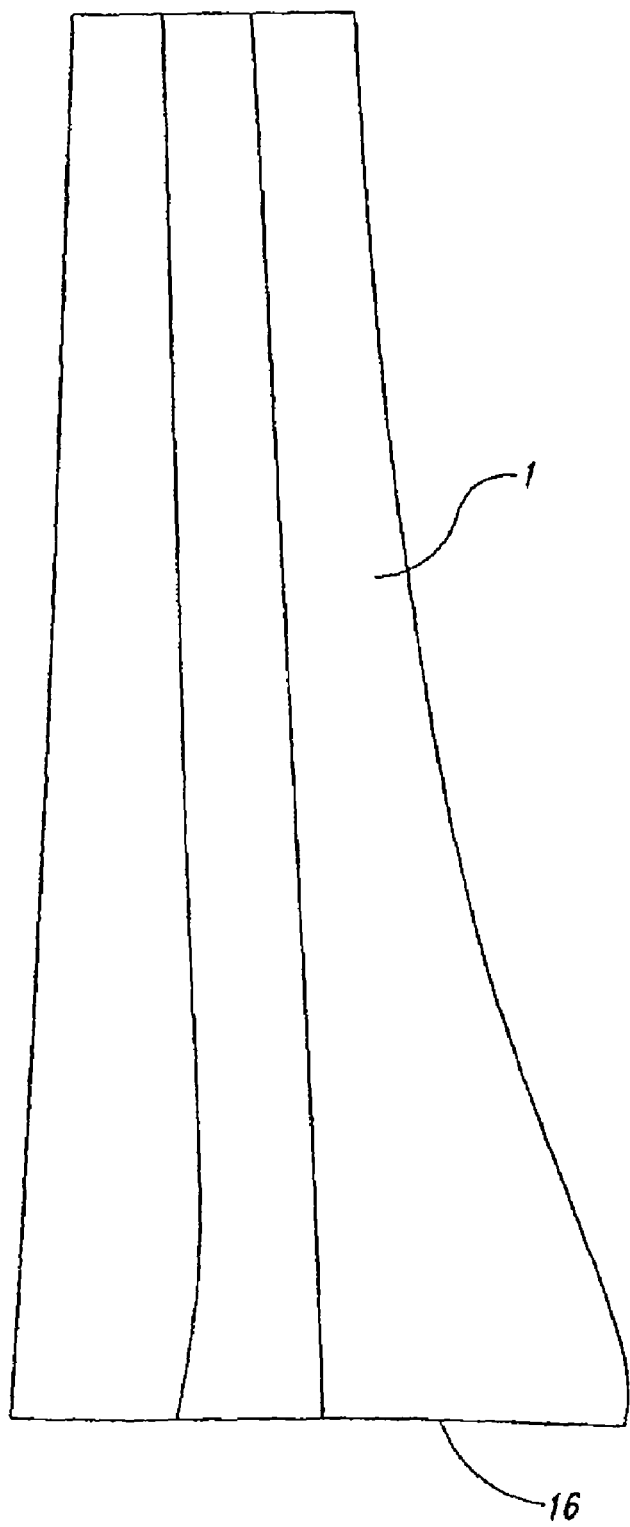
Figure 11:
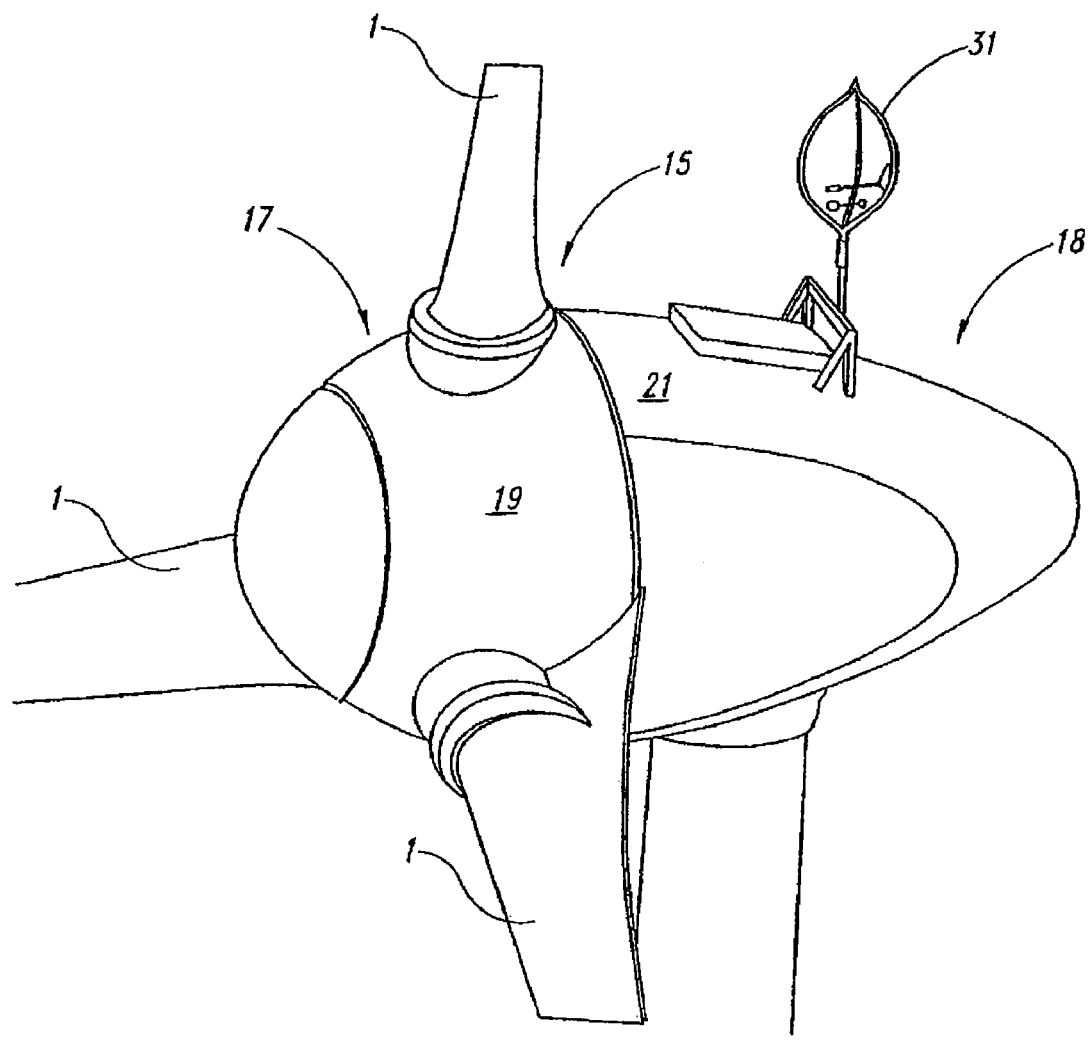
FIGS. 11-17 and 19 show various views of a wind power installation according to the invention.
Figure 12:
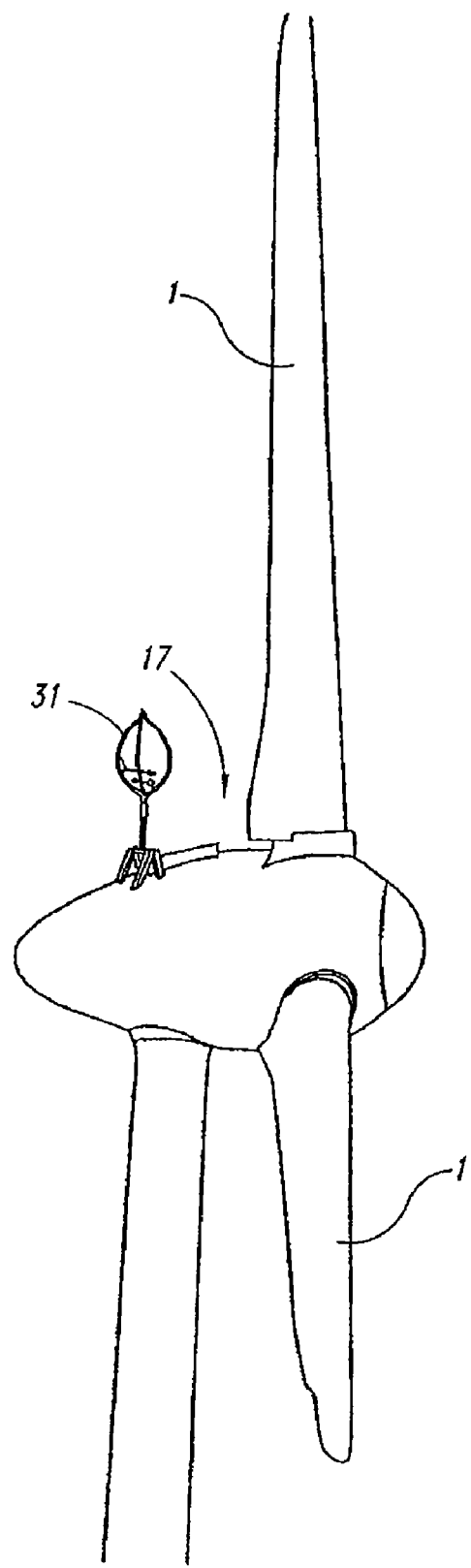
Figure 13:
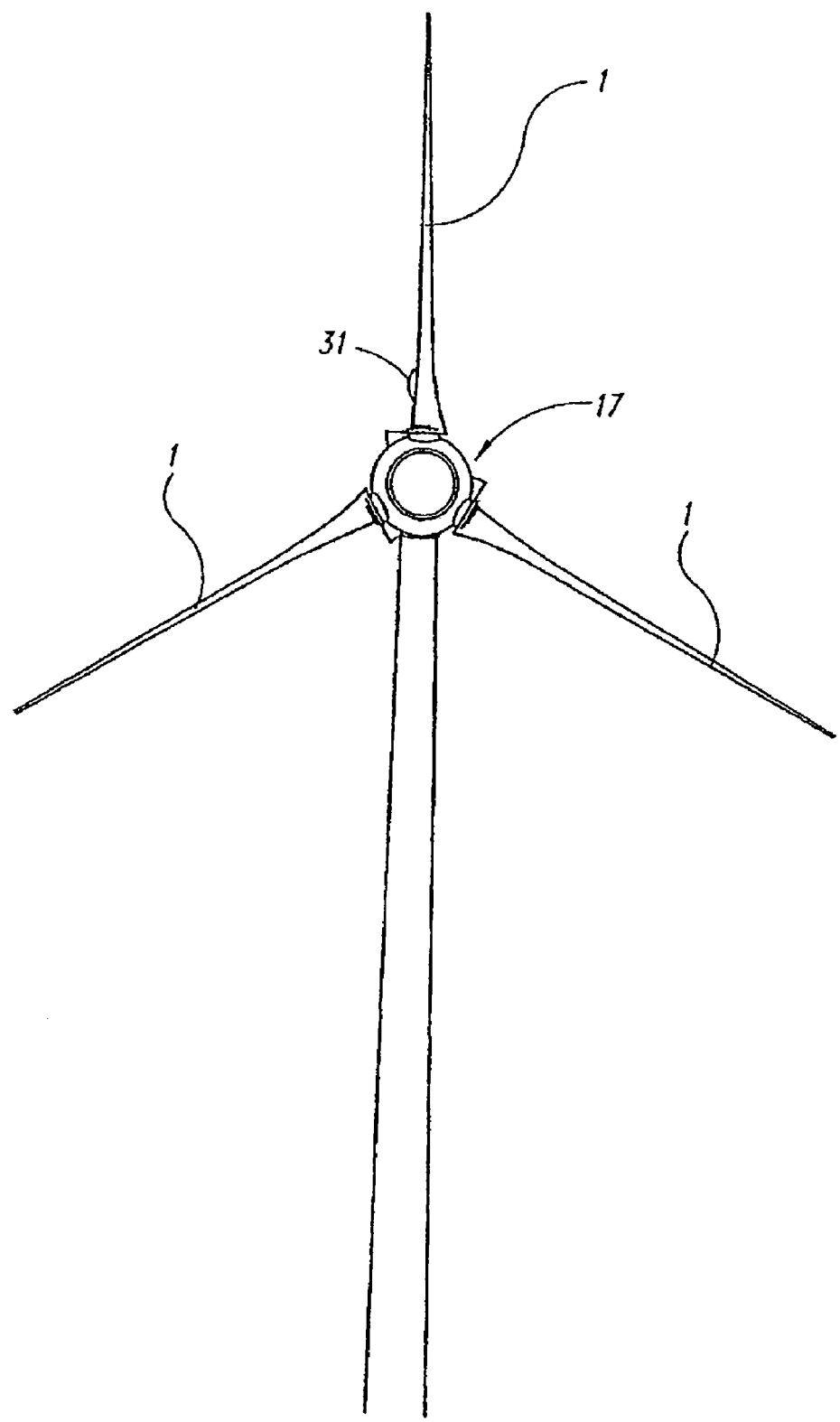
Figure 14:
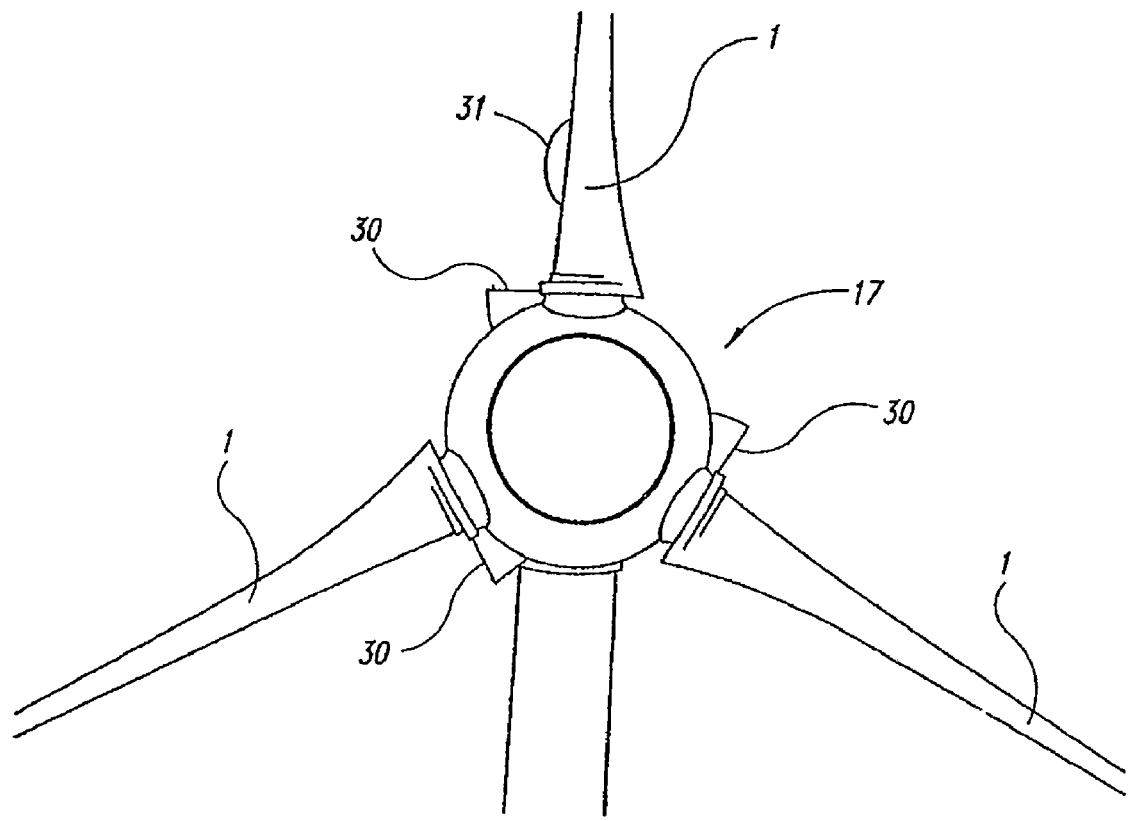

In one embodiment as best illustrated in FIGS. 3 and 11, the 'slip hole' can be 'closed' by virtue of the trapezoidal configuration of the rotor blade 1 in the region near the hub 17, then an improved distribution of air flow over the entire circular surface area can be achieved. In addition, the efficiency of the outer region of the rotor blade is also increased somewhat. Accordingly, 'closing' the 'slip hole' makes a contribution to the higher power output of the rotor blade 1.

Another insufficiency of the current calculation programs is that they consider the rotor blade portion directly adjoining the 'slip hole' as a full-value rotor blade portion which it cannot be, because of the particular flow conditions, which results in frequent flow breakdowns.

Figure 9:
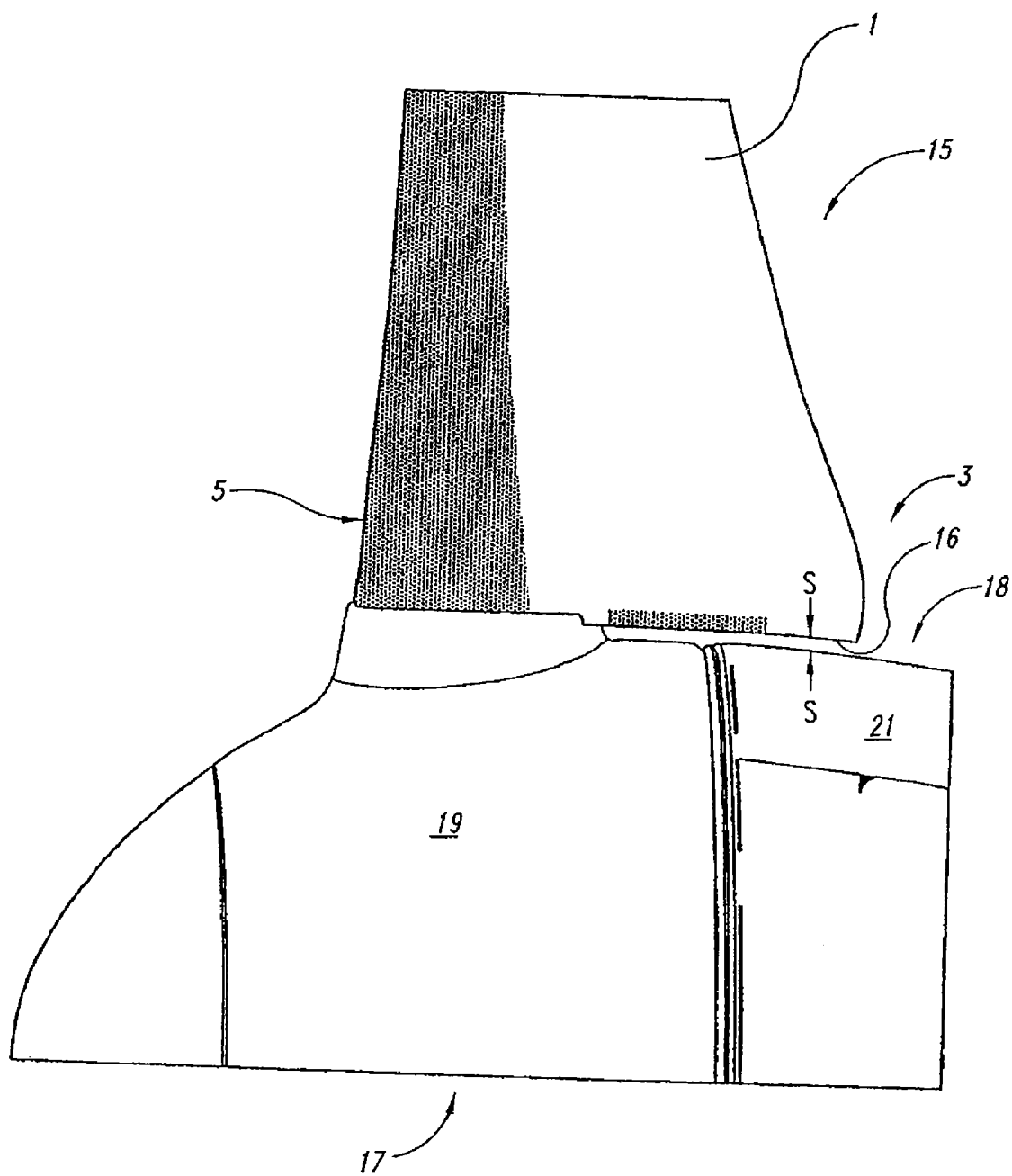
FIG. 9 shows a view on an enlarged scale of a wind power installation according to the invention.
Figure 10:
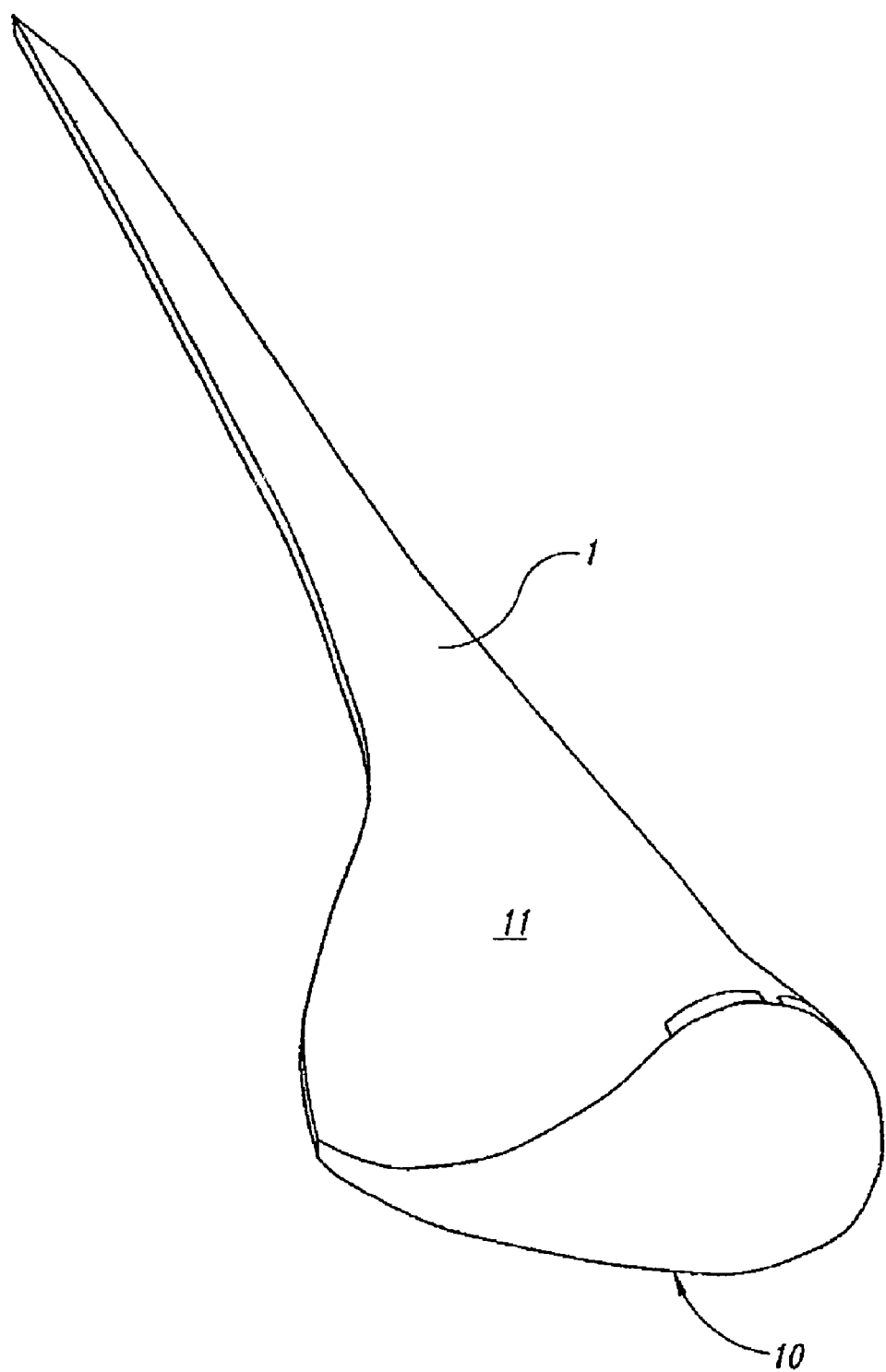
FIG. 10 shows a view of a rotor blade according to the invention.

FIGS. 3 and 11 show a wind power installation according to one illustrated embodiment. The three rotor blades 1 have an almost seamless transition with respect to the external configuration of the pod cladding 21 and with respect to the hub cladding 19 when the rotor blades 1 are in a nominal wind position. FIG. 9 illustrates that if the wind increases above nominal wind speed, then the rotor blades 1 are moved slowly to change their pitch to the wind by pitch control or pitch regulation and a large spacing "S" develops between the lower edge 16 of the rotor blade 1 and the hub cladding 19 and pod cladding 21, respectively. FIG. 11, however, shows that when the contour of the hub cladding 19 and the contour of the pod cladding 21 substantially correspond to the edge profile of the rotor blade 1 in the region near the hub 19 and which, when the rotor blade 1 is set in an angle of incidence at the nominal speed, is directly below the rotor blade so that there is only a small gap "S" between the structure and the rotor blade in the region near the hub.

When the rotor blade 1 is in the feathered position, with reduced surface area towards the wind, the rotor blade 1 is parallel to the lower edge 16 that is towards the pod 18 and the spacing between the lower edge 16 and the external contour of the pod cladding 21 is at a minimum, preferably being less than 50 cm or even less than 20 cm.

When the rotor blade 1 is set into the wind, it involves a large surface area even in the very near region of the rotor blade (the slip hole is very small). The above-mentioned reference Erich Hau shows that the rotor blade in the state of the art decreases regularly in the region near the hub 17 (the rotor blades are there less wide than at their widest location). Conversely, the widest location of the rotor blade 1 according to at least one embodiment of the invention is in the region near the hub 17 so that the wind can be utilized to the best possible extent.

Referring back to the rotor blade profile shown in FIG. 18, the leading edge radius 5 is approximately 0.146 of the profile depth.

The reduced-pressure side 10 has a longer, almost straight region. In this region, at between 38% and 100% of the profile depth, the radius is about 1.19 times the length of the profile depth. Between 40% and 85% of the profile depth, the radius is about 2.44 times the profile depth. And, between 42% and 45% of the profile depth, the radius is about 5.56 times of the profile depth.

In the region between 36% and 100% of the profile depth, the maximum deviation from an ideal straight line is about 0.012 of the profile length. This value is an important variable as the curvature radius varies and the greatest curvature radius is already specified in the respective regions.

In the illustrated embodiment of FIG. 18, the length of the reduced-pressure side 10 is about 1.124 of the length of the profile depth while the length of the increased-pressure side 11 is 1.112 of the length of the profile depth. This means that the reduced-pressure side 10 is only immaterially longer than the increased-pressure side 11. It is advantageous if the ratio of the reduced-pressure side 10 length to the increased-pressure side 11 length is less than 1.2, preferably less than 1.1 or in a range of values of between 1 and 1.03.

It can be seen from the illustrated Figures that the rotor blade 1 has its greatest profile depth directly at the spinner or hub 17, that is to say at the outside of the pod 18 of the wind power installation. For a wind power installation with a rotor diameter of 30 m, the profile depth at the spinner 17 is between about 1.8 to 1.9, preferably 1.84. If then the spinner 17 is approximately of a diameter of 3.2 mm, the ratio of the profile depth of the rotor blade 1 at the spinner to the spinner diameter is about 0.575. It is further advantageous if the ratio of the profile depth to the spinner diameter is greater than a value of 0.4 or in a range of values of about 0.4 to 1. In the above-specified example, the ratio of the profile depth to the rotor diameter is about 0.061. The 'slip hole' can be made as small as possible if the ratio of the profile depth to the rotor diameter is greater than a value of between 0.05 and 0.01.

In another example, a rotor blade 1 with a profile cross-section similar to the one shown in FIG. 18, the first third of the profile, has a profile depth at the spinner of about 4.35 mm, a spinner diameter of 5.4 m and a rotor diameter of about 71 m. Thus, the value of the profile depth to the spinner diameter is 0.806 and the ratio of the profile depth to the rotor diameter is again 0.061. The above-indicated values relate to a triple-blade rotor with pitch regulation.

Figure 15:
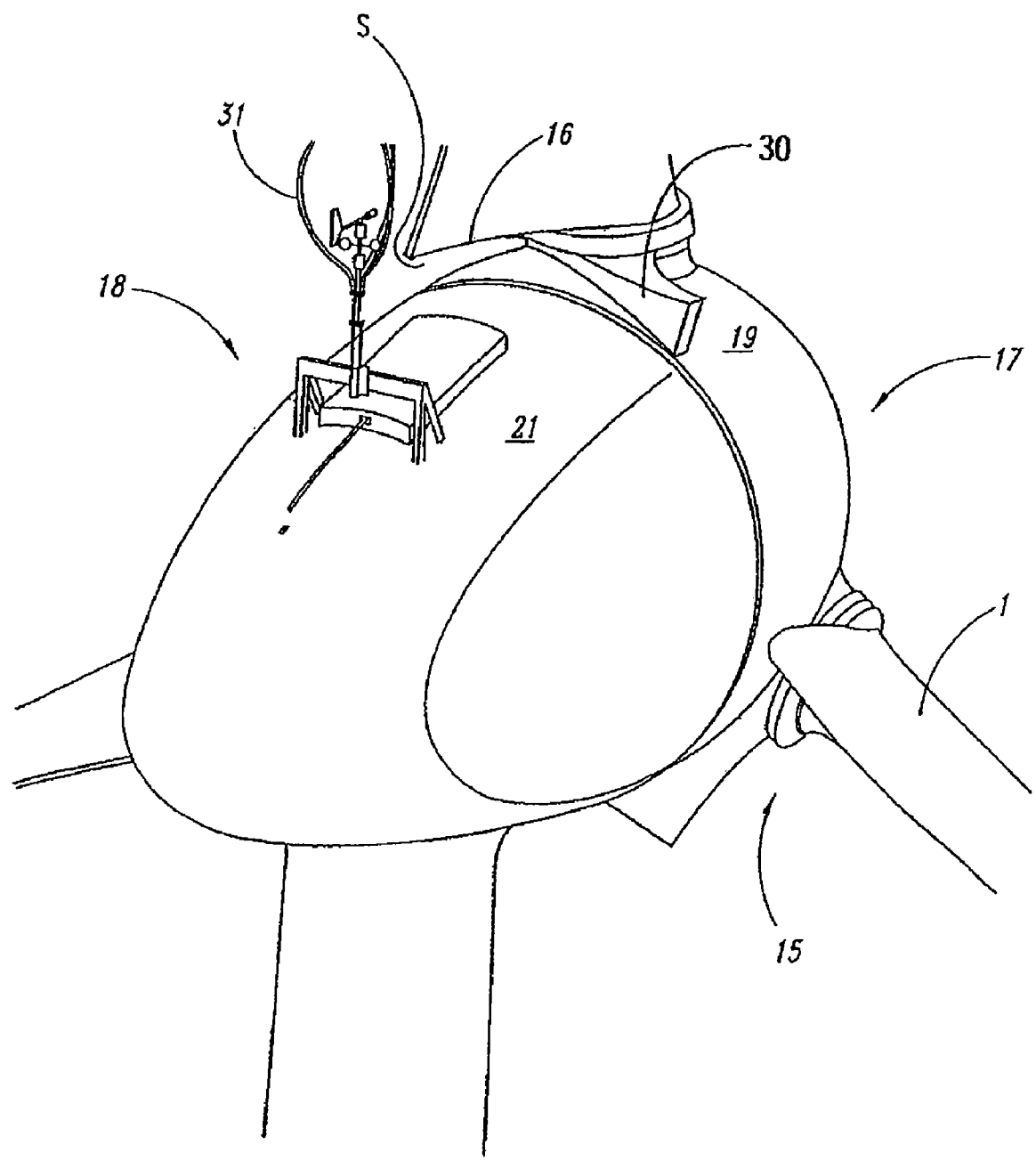

As described, a rotor blade 1 according to another embodiment of the invention can have its greatest profile depth in the region near the hub 17 and the rotor blade 1 can further include the rotor blade portion 30. FIG. 15 illustrates the rotor blade portion 30, which is a physically separable component with respect to the rotor blade 1, but is considered to a functional part of the rotor blade 1 with respect to carrying air loads. The rotor blade portion 30, although not an integral part of the rotatable rotor blade 1, can be an integral, constituent part of the hub cladding 19 or affixed to the hub cladding 19 of the hub 17, which is further a part of the pod 18, in a variety of ways (e.g., joined, screwed and so forth). In addition the lower edge of the rotor blade portion 30, that is to say the edge which faces towards the pod of the wind power installation, can be substantially adapted to or matched to the external contour of the hub cladding 19 and/or pod cladding 21 in the longitudinal direction. Accordingly in this case, when a rotor blade 1 is in the feathered position, (practically no longer where hardly any surface area which faces towards the wind), the rotor blade 1 is parallel to the lower edge 16 that is towards the pod 18 and the spacing between the lower edge 16 and the external contour of the pod is at a minimum, preferably being less than 50 cm or even better less than 20 cm.

As is known, it is precisely when dealing with very large rotor blades 1 that a very great rotor blade width is involved in the region near the hub 17. In order for such rotor blades 1 to be transported, the rotor blade 1 can be of a two-part configuration, in which the two parts are separated during transport and re-assembled after transport. In such an embodiment, the two parts are connected together before being installed on the wind power installation, for example by way of screw connections and/or secure connections (e.g., adhesive). Large rotor blades may be accessible from the interior for being fitted together so that such a rotor blade can have of a unitary assembled appearance on the exterior and the separation lines are scarcely visible or not visible at all.

As initial measurements show, the rotor blade 1 according to embodiments of the present invention can markedly have an increased efficiency in comparison with previous rotor blades.

As can be seen from FIGS. 4-8, the rotor blades 1 have their greatest profile depth in the region near the hub 17. In addition, the rotor blade portions, along their respective edge profiles, are configured to substantially conform to the contour of the hub cladding 19 and/or the pod cladding 21. Accordingly, at least for the position in which the rotor blade 1 assumes an angle that corresponds to wind speeds up to the nominal wind range, there may be a very small spacing relative to the pod cladding 21.

Figure 16:
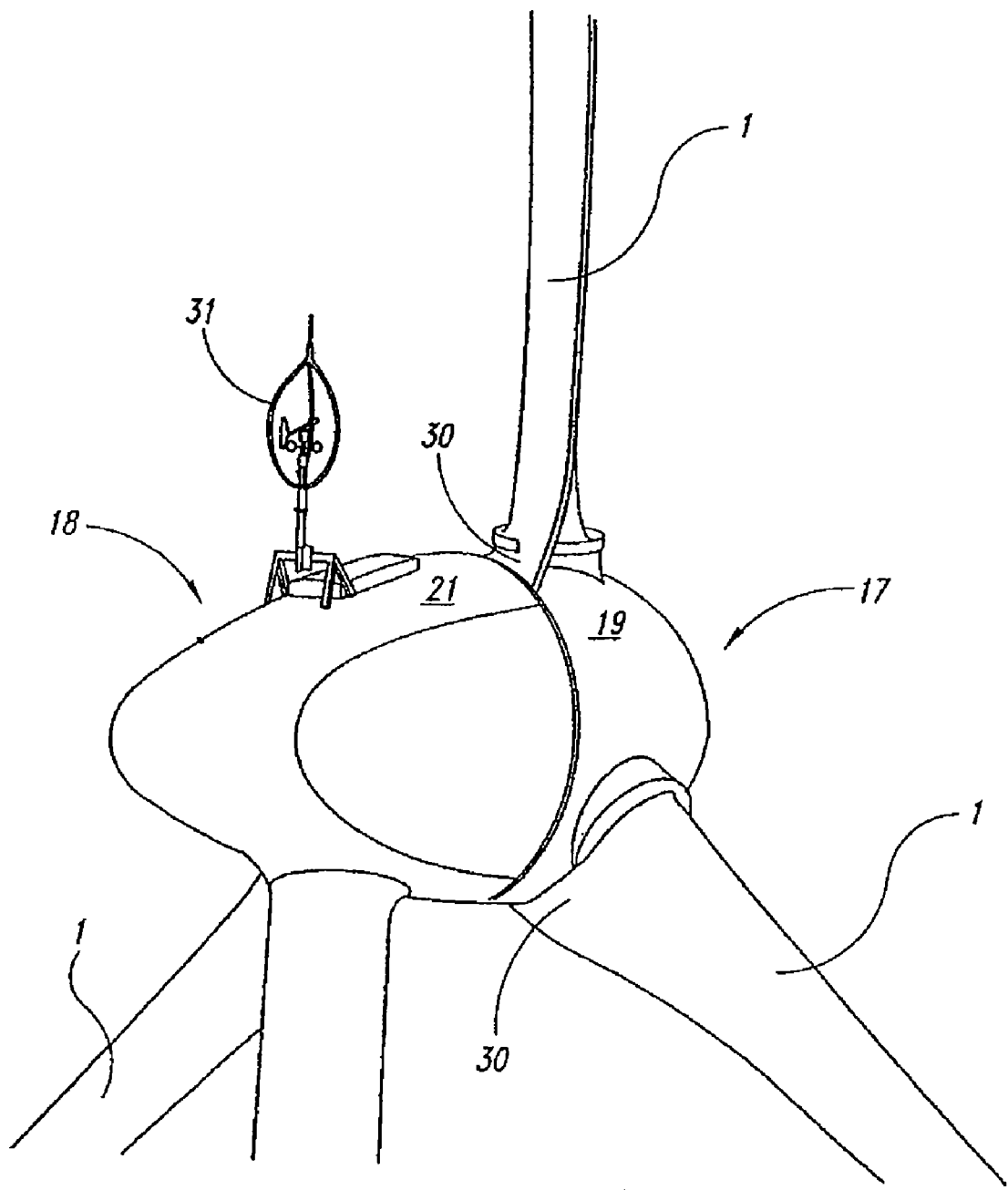

FIG. 16 illustrates a seamless transition between the feathering portion of the rotor blade 1 and the non-feathering portion 30 is indicated in by the lack of any demarcation line between the blade portions 1 and 30.

The rotor blade portion 30, which as previously stated, is not an integral constituent part of the overall rotor blade 1 is affixed to the pod 18, or more specifically to the hub cladding 19 of the hub 17. The rotor blade portion 30 located on the outside of the pod is fixed thereto and arranged at an angle corresponding to the angular position of a rotor blade 1 up to the nominal wind speed. Thus, at wind speeds up to the nominal wind, there are minimal gaps between the lower edge 16 of the rotor blade 1, the rotor blade portion 30, and the pod 18, respectively. The rotor blade portion 30 can be screwed to the pod 18 or can also be glued or joined in one piece to the pod 18.

Figure 19:
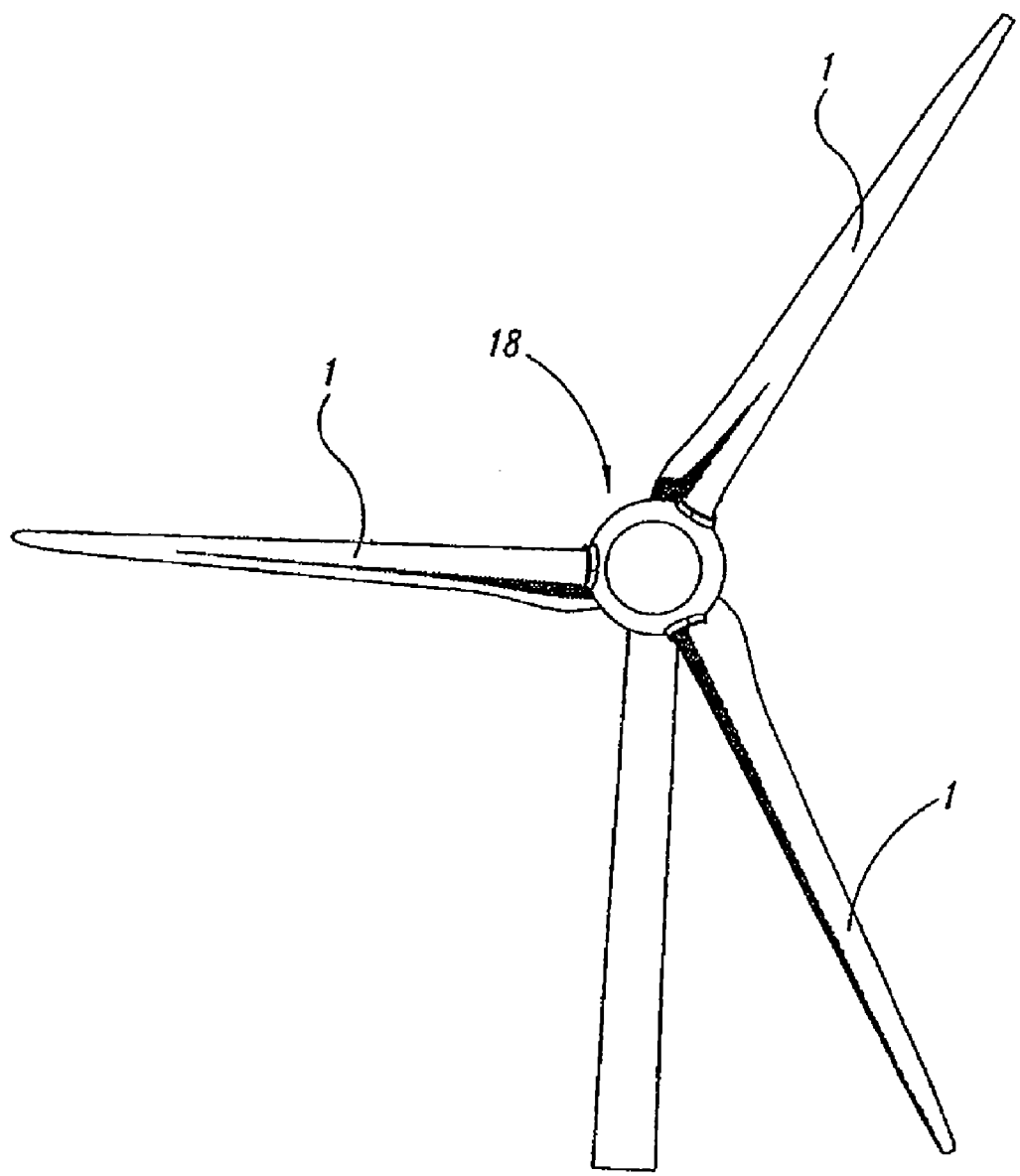

FIG. 19 illustrates that there is only a quite small 'slip hole' for the wind that cannot be seen from a distance by virtue of the configuration of the rotor blades 1 in relation to the rotor blade portion 30.

Figure 17:
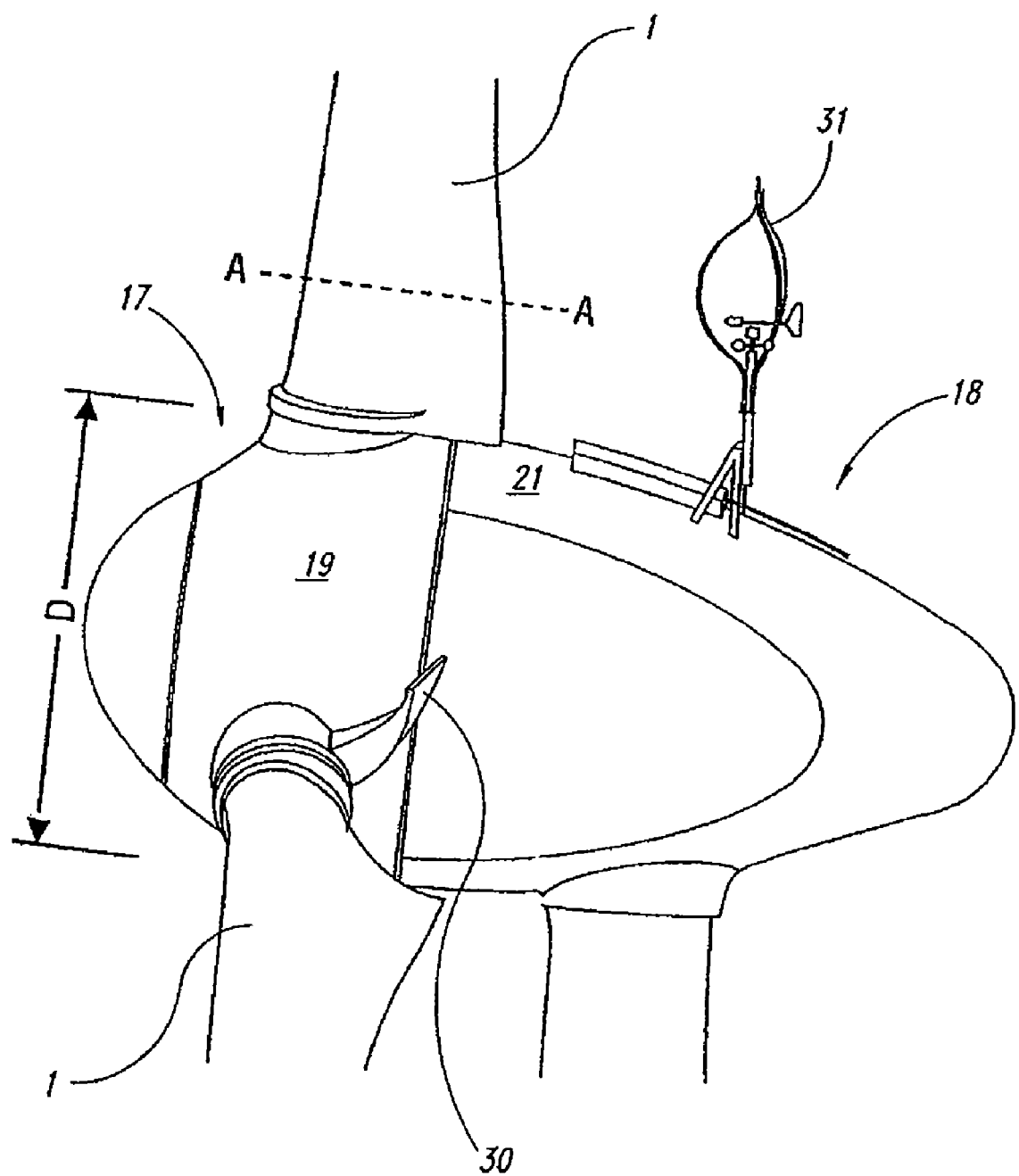

FIG. 18 shows a cross-section through a rotor blade according to the invention as taken along line A-A in FIG. 17, that is to say the profile of the rotor blade in the region near the hub.

FIG. 17 also includes an indication of what is to be understood by the diameter D of the spinner.

The rotor diameter is described by the diameter of the circular area which is covered by the rotor when it rotates.

As can be seen from FIG. 15 and other Figures the rotor blade portion 30 of the rotor blade 1 which is not an integral constituent part of the rotatable rotor blade 1 is an integral constituent part of the outside cladding 19 of at least the hub 17. The respective portion 30 can be screwed to the pod or can also be glued or joined in one piece to the pod.

Referring back to FIG. 11, a wind and/or weather sensor 31 is attached to the pod 18 according to one illustrated embodiment. The sensor 31 can measure a variety of parameters such as wind velocity, direction, temperature, etc. This information may be recorded or transmitted.

TABLE 1

| X-Y-COORDINATES | |
|---|---|
| x | y |
| 1.000000 | 0.013442 |
| 0.983794 | 0.020294 |
| 0.958357 | 0.030412 |
| 0.930883 | 0.040357 |
| 0.899462 | 0.050865 |
| 0.863452 | 0.062358 |
| 0.823890 | 0.074531 |
| 0.781816 | 0.086987 |
| 0.737837 | 0.099513 |
| 0.692331 | 0.111993 |
| 0.645363 | 0.124434 |
| 0.597614 | 0.136709 |
| 0.549483 | 0.148731 |
| 0.503007 | 0.160228 |
| 0.481036 | 0.170758 |
| 0.425769 | 0.179639 |
| 0.397598 | 0.186588 |
| 0.374996 | 0.191889 |
| 0.356186 | 0.195840 |
| 0.339750 | 0.198668 |
| 0.324740 | 0.200524 |
| 0.310542 | 0.201512 |
| 0.296731 | 0.201704 |
| 0.232999 | 0.201174 |
| 0.269154 | 0.200007 |
| 0.255115 | 0.198267 |
| 0.240876 | 0.195985 |
| 0.226479 | 0.193185 |
| 0.212006 | 0.189892 |
| 0.197571 | 0.186146 |
| 0.183315 | 0.181995 |
| 0.169384 | 0.177505 |
| 0.155924 | 0.172745 |
| 0.143051 | 0.167780 |
| 0.130850 | 0.162675 |
| 0.119369 | 0.157478 |
| 0.108625 | 0.152229 |
| 0.098610 | 0.146953 |
| 0.089297 | 0.141664 |
| 0.080653 | 0.136362 |
| 0.072636 | 0.131036 |
| 0.065201 | 0.125679 |
| 0.058312 | 0.120269 |
| 0.051931 | 0.114786 |
| 0.046015 | 0.109229 |
| 0.040531 | 0.103598 |
| 0.035457 | 0.097893 |
| 0.030772 | 0.092113 |
| 0.026461 | 0.086252 |
| 0.022520 | 0.080332 |
| 0.018937 | 0.074321 |
| 0.015688 | 0.068240 |
| 0.012771 | 0.062095 |
| 0.010196 | 0.055378 |
| 0.007926 | 0.049601 |
| 0.005911 | 0.043298 |
| 0.004164 | 0.036989 |
| 0.002755 | 0.030661 |
| 0.001709 | 0.024300 |
| 0.000953 | 0.017915 |
| 0.000415 | 0.011534 |

TABLE 1-continued

X-Y-COORDINATES

| x | y |
|---|---|
| 0.000088 | 0.005186 |
| 0.000000 | 0.000000 |
| 0.000197 | −0.007376 |
| 0.000703 | −0.013612 |
| 0.001550 | −0.019816 |
| 0.002704 | −0.025999 |
| 0.004080 | −0.032162 |
| 0.005649 | −0.038281 |
| 0.007477 | −0.044316 |
| 0.009639 | −0.050245 |
| 0.012124 | −0.056078 |
| 0.014883 | −0.061829 |
| 0.017905 | −0.067491 |
| 0.021204 | −0.073045 |
| 0.024779 | −0.078485 |
| 0.028618 | −0.083809 |
| 0.032721 | −0.089004 |
| 0.037087 | −0.094062 |
| 0.041711 | −0.098973 |
| 0.046594 | −0.103723 |
| 0.051740 | −0.108301 |
| 0.057150 | −0.112695 |
| 0.062824 | −0.116897 |
| 0.068769 | −0.120893 |
| 0.074991 | −0.124669 |
| 0.081500 | −0.128219 |
| 0.088310 | −0.131521 |
| 0.095450 | −0.134551 |
| 0.102955 | −0.137294 |
| 0.110872 | −0.139735 |
| 0.119262 | −0.141872 |
| 0.128192 | −0.143724 |
| 0.137734 | −0.145316 |
| 0.147962 | −0.146667 |
| 0.158934 | −0.147800 |
| 0.170663 | −0.148727 |
| 0.183106 | −0.149431 |
| 0.196155 | −0.149877 |
| 0.209657 | −0.150001 |
| 0.223475 | −0.149715 |
| 0.237539 | −0.148932 |
| 0.251855 | −0.147579 |
| 0.266497 | −0.145597 |
| 0.281578 | −0.142949 |
| 0.297206 | −0.139628 |
| 0.313400 | −0.135651 |
| 0.330088 | −0.131016 |
| 0.347173 | −0.125692 |
| 0.364627 | −0.119588 |
| 0.382602 | −0.112537 |
| 0.401480 | −0.104293 |
| 0.421912 | −0.094548 |
| 0.444568 | −0.083182 |
| 0.468376 | −0.071217 |
| 0.491608 | −0.060017 |
| 0.514034 | −0.049898 |
| 0.535806 | −0.040854 |
| 0.557225 | −0.032760 |
| 0.578580 | −0.025495 |
| 0.600131 | −0.018956 |
| 0.622095 | −0.013059 |
| 0.644620 | −0.007755 |
| 0.667811 | −0.003015 |
| 0.691690 | 0.001179 |
| 0.716104 | 0.004827 |
| 0.740707 | 0.007908 |
| 0.364985 | 0.010392 |
| 0.788448 | 0.012236 |
| 0.810817 | 0.013425 |
| 0.832004 | 0.013957 |
| 0.852100 | 0.013834 |
| 0.871284 | 0.013058 |
| 0.889797 | 0.011606 |
| 0.907926 | 0.009441 |
| 0.925997 | 0.006502 |
| 0.944381 | 0.002701 |
| 0.963552 | −0.002134 |
| 0.984409 | −0.008335 |
| 1.000000 | −0.013442 |
| 0.000197 | −0.007376 |
| 0.000703 | −0.013612 |
| 0.001550 | −0.019816 |
| 0.002704 | −0.025999 |
| 0.004080 | −0.032162 |
| 0.005649 | −0.038281 |
| 0.007477 | −0.044316 |
| 0.009639 | −0.050245 |
| 0.012124 | −0.056078 |
| 0.014883 | −0.061829 |
| 0.017905 | −0.067491 |
| 0.021204 | −0.073045 |
| 0.024779 | −0.078485 |
| 0.028618 | −0.083809 |
| 0.032721 | −0.089004 |
| 0.037087 | −0.094062 |

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A wind power installation comprising:
   a pod including a rotor hub and a hub cladding at least partially surrounding the rotor hub;
   a rotor blade mounted to the rotor hub, the rotor blade having a rotor blade leading edge, a rotor blade trailing edge, exterior surfaces spanning between the leading edge and trailing edge, and a rotor blade cross-section at a root of the rotor blade defined in part by the rotor blade leading edge and rotor blade trailing edge, the rotor blade rotatable about a longitudinal axis to adjust a pitch of the rotor blade; and
   a fixed rotor blade base structure separate from the rotor blade and fixedly connected to the hub cladding, the fixed rotor blade base structure having a profile that substantially corresponds to a profile of the rotor blade near the rotor hub, the fixed rotor blade base structure being positioned longitudinally immediately adjacent to the rotor blade with respect to the longitudinal axis and shaped such that, when the blade is in a nominal position, exterior surfaces of the rotor blade base structure transition substantially without obstruction to the exterior surfaces of the rotor blade at the root.

2. The wind power installation of claim 1 wherein the fixed rotor blade base structure is oriented such that at nominal wind speed the pitch of the rotor blade is adjusted such that the rotor blade is aligned with the fixed rotor blade base structure near the rotor hub.

3. The wind power installation of claim 1 wherein the fixed rotor blade base structure is integral with the hub cladding.

4. The wind power installation of claim 1 wherein the rotor blade comprises a reduced-pressure side and an increased-pressure side, and, in a cross-section of the rotor blade near the root, a ratio of a length of the reduced-pressure side to a length of the increased-pressure side is less than 1.2.

5. The wind power installation of claim 4 wherein the ratio of the length of the reduced-pressure side to the length of the increased-pressure side is less than 1.1.

6. The wind power installation of claim 4 wherein the ratio of the length of the reduced-pressure side to the length of the increased-pressure side is between 1 and 1.03.

7. A wind power installation comprising:
a pod including a rotor hub;
a rotor blade rotatably mounted to the rotor hub about a longitudinal axis, the rotor blade having exterior surfaces and a rotor blade cross-section at a root of the rotor blade defined in part by a rotor blade leading edge and rotor blade trailing edge; and
a rotor blade base structure separate from the rotor blade and fixedly connected to the pod, the rotor blade base structure being positioned longitudinally immediately adjacent to the rotor blade with respect to the longitudinal axis and having a profile that substantially corresponds to a profile of the rotor blade near the root of the rotor blade and located in a position in which, when the blade is in a nominal position, the exterior surfaces of the rotor blade transition substantially without obstruction to correspondingly shaped exterior surfaces of the rotor blade base structure.

8. The wind power installation of claim 7 wherein the rotor blade base structure is oriented such that at nominal wind speed the pitch of the rotor blade is adjusted such that the rotor blade is aligned with the fixed rotor blade base structure near the rotor hub.

9. The wind power installation of claim 7 wherein the rotor blade comprises a reduced-pressure side and an increased-pressure side, and, in a cross-section of the rotor blade near the root, a ratio of a length of the reduced-pressure side to a length of the increased-pressure side is less than 1.2.

10. A wind power installation comprising:
a pod including a rotor hub;
a rotor blade rotatably mounted to the rotor hub about a longitudinal axis, the rotor blade having a rotor blade cross-section at a root of the rotor blade defined in part by a rotor blade leading edge and rotor blade trailing edge, the leading edge of the rotor blade positioned to receive a flow of air without obstruction when the rotor blade is in a nominal position; and
a rotor blade base structure separate from the rotor blade and fixedly connected to the pod, the rotor blade base structure immediately next to the rotor blade with respect to the longitudinal axis and having a profile that substantially corresponds to a profile of the rotor blade near the root of the rotor blade such that, when the blade is in the nominal position, exterior surfaces of the rotor blade transition substantially without obstruction to correspondingly shaped exterior surfaces of the rotor blade base structure.

\* \* \* \* \*